United States Patent [19]

David et al.

[11] 3,864,662
[45] Feb. 4, 1975

[54] TELEMETRY SYSTEMS EMPLOYING ACTIVE TRANSPONDERS

[75] Inventors: Pierre Y. David, Lyon; Joel M. Charles, La Velette, both of France

[73] Assignee: Etat Francais, represente par le Ministre d'Etat charge de la Defense Nationale-Delegation Ministerielle pour l'Armement-Direction Technique des Constructions, Paris, France

[22] Filed: May 18, 1973

[21] Appl. No.: 361,427

[52] U.S. Cl. ............... 340/3 R, 340/3 E, 343/6.5 R
[51] Int. Cl. .......................... G01s 9/68, G01s 5/18
[58] Field of Search ........................ 340/2, 3 R, 3 E; 343/6.5 R

[56] References Cited
UNITED STATES PATENTS
3,432,851  3/1969  Cox, Jr. et al. .................. 343/6.5 R
3,460,060  8/1969  Abruzzo et al. ................... 343/6 X Primary Examiner—Richard A. Farley
Attorney, Agent, or Firm—Larson, Taylor & Hinds

[57] ABSTRACT

A telemetry system is provided which enables positioning of a vehicle equipped with an interrogator relative to at least two active transponders whose relative coordinates are initially unknown. The separation of the transponders is initially measured by interrogating the transponders with a code whereby one of the transponders produces a single response and the other produces two consecutive responses, the first responsive to reception of the interrogation signal and the second responsive to the reception of the response produced by the other transponder. By providing a further vehicle with a transponder similar to the reference transponders, the further vehicle can be positioned simultaneously with the main vehicle. The invention is particularly applicable to positioning marine and/or underwater vehicles relative to submerged transponders although it is also applicable to landing aircraft under poor visibility conditions.

4 Claims, 2 Drawing Figures

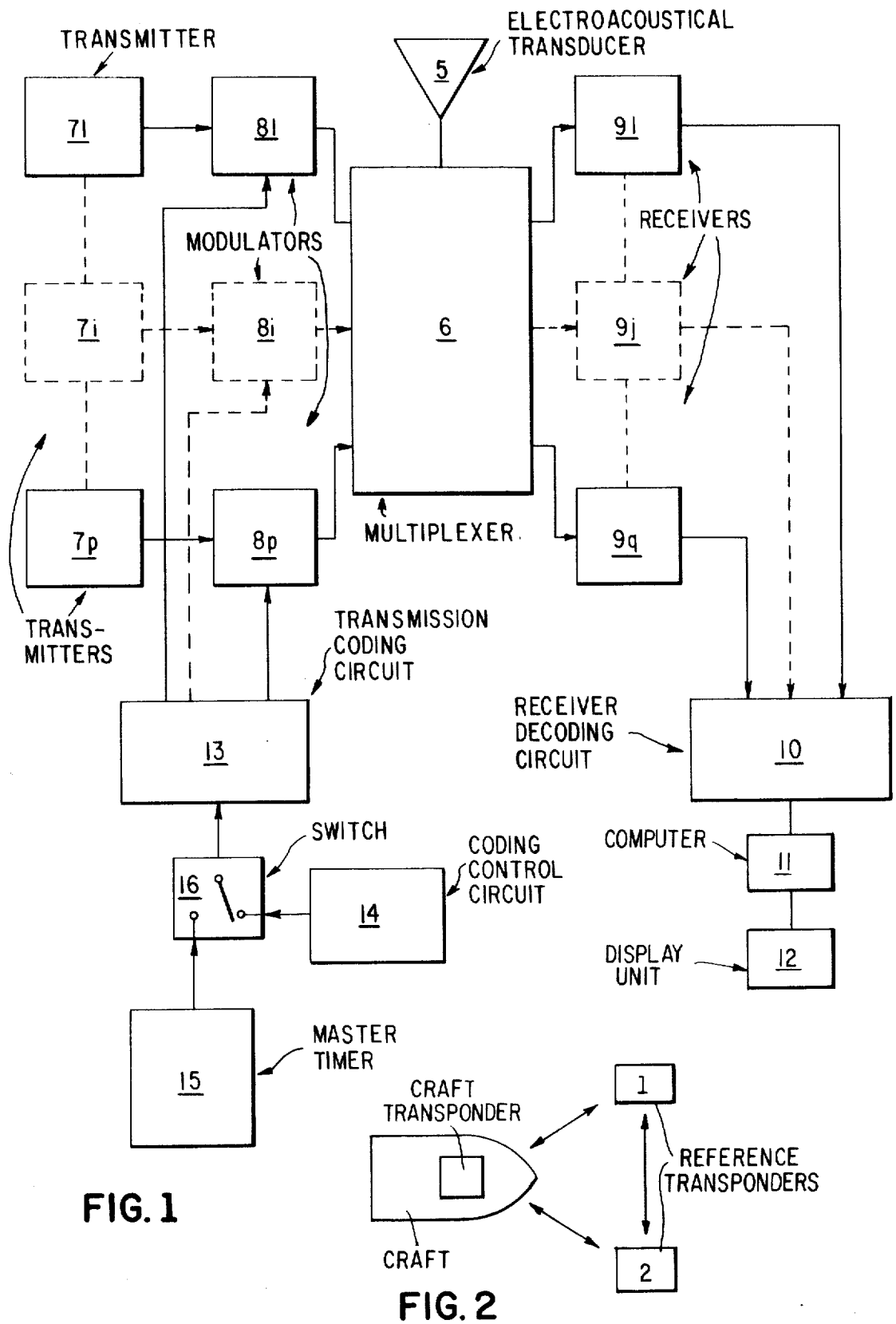

TELEMETRY SYSTEMS EMPLOYING ACTIVE TRANSPONDERS

FIELD OF THE INVENTION

The present invention relates to improvements in navigation or telemetry systems employing active transponders and, more particularly, to the relative positioning of a body, such as a marine or underwater vehicle, in relation to at least two active transponders whose separation distance is initially unknown.

BACKGROUND OF THE INVENTION

Conventional electronic navigation systems employ a transmitting and receiving unit known as an interrogator. This unit is used to interrogate active transponders (sometimes referred to as "responders") and thus make it possible to locate the transponders. Further, this technique enables one to telecontrol certain operations relating to the transponders. In operation, the signal transmitted by the interrogator is received and detected by the transponder which, in turn, transmits a response signal. The time taken by the interrogation signal to be received by the transponder, added to that taken by the response signal transmitted by the transponder to reach the interrogator, is a measure of the distance that separates the two units, assuming that the velocity of the signals in the propagation medium is known with precision. Coding of the interrogation and/or response signals allows the interrogator to identify the various transponders with which it may be in contact.

To properly position a body such as a marine or underwater vehicle, it is necessary to make a measurement in relation to at least two active transponders, which implies the need, at the time of measurement, to know with precision the distance that separates the two transponders. This distance is not always readily determinable and, in general, is measured only at the time of installation of the transponders by more or less complex procedures.

SUMMARY OF THE INVENTION

In accordance with the present invention, disadvantages associated with the navigation techniques discussed above are eliminated through the provision of a procedure, and a system, which make it possible to determine the distance between two transponders prior to any positioning operation relative to these transponders. Further, the invention permits the simultaneous positioning of several bodies in relation to one another with reference to at least two active transponders.

According to the invention, the distance of the two transponders is measured initially by interrogating the transponders by a code such that one of the transponders provides a single response to a first frequency termed the "general frequency", while the other transponder, in turn, provides two responses according to its own code, one subsequent to reception of the interrogation signal and the other subsequent to reception of the response to the "general frequency" signal by the other transponder. The same operation is then repeated by reversing the respective roles of the transponders so as to provide a redundant measurement.

According to another aspect of the invention, another body provided with a transponder can be positioned at the same time as the main body equipped with the interrogator, by interrogating this transponder such that the transponder responds to the "general frequency" signal, the reference transponders then, in turn, transmitting to two responses according to their own code, the first subsequent to the reception of the interrogation signal and the second subsequent to the reception of the "general frequency" signal retransmitted by the mobile transponder. The periods thus measured permit computers associated with the two bodies to work out the coordinates of the bodies.

Other features and advantages of the invention will be set forth in, or apparent from, the detailed description of a preferred embodiment found hereinbelow.

BRIEF DESCRIPTION OF THE DRAWINGS

FIG. 1 is a block diagram of an embodiment of an interrogator-receiver which permits practice of the invention; and FIG. 2 is a highly schematic diagram of a marine craft and its transponder, and two reference transponders, illustrating the signal paths therebetween.

DESCRIPTION OF A PREFERRED EMBODIMENT

The following description, which is given by way of non-limiting example, is particularly related to the positioning of marine and/or underwater vehicles in relation to at least two ultrasonic transponders placed at stationary points in relation to, or on, the underwater floor. In this exemplary application of the system according to the invention, it is important that the distance calculating unit, mounted on board the vehicle to be positioned, know the depth of submersion of each transponder. To this end, the transponders are interrogated in a preestablished manner. When the vehicle to be positioned is of the underwater type, knowledge of the submersion depth of said vehicle permits the calculating unit to determine the relative submersion depth of the transponders which is then used in the calculation of distances to be determined.

A further mode of interrogation makes it possible to telecontrol the release of the transponders.

To control these operations regarding transmission of submersion depth and release signals, the transmission code requires the use of several frequencies, viz, (1) a frequency $F_o$ which, depending on whether it is present or absent, enables the transponder to identify the nature of the operation that it is to perform and (2) n other frequencies $f_1$ to $f_n$, termed "addressing" frequencies, which enable the transponders to recognize that the interrogation is addressed solely to those of $2^n$ possible transponders. The transmission code further comprises (3) an additional frequency $F_g$, termed the "general frequency" which, depending on whether it is present or absent, controls the response of the transponder concerned, according to said general frequency $F_g$ or according to a code peculiar to that transponder. This makes it possible to measure the distance that separates two transponders as well as the distances separating the interrogator from the various transponders. The following table shows an example of a transmission code using four frequencies, $F_g$, $F_o$, $F_1$, and $F_2$, thus permitting the control of four transponders ($n = 2$ and $2^n = 4$):

| Code No | Codes Transmitted By Interrogator | | | | Transponder Responses |
|---|---|---|---|---|---|
| | $F_p$ | $F_o$ | $F_1$ | $F_2$ | |
| A | Yes | No | Yes or No | Yes or No | Transmission of the particular frequency of transponders 1 to 4 |
| B | Yes | Yes | Yes | Yes | Transmission of general frequency $F_g$ by transponder 1 |
| C | Yes | Yes | Yes | No | Transmission of general frequency $F_g$ by transponder 2 |
| D | Yes | Yes | No | No | Transmission of general frequency $F_g$ by transponder 3 |
| E | Yes | Yes | No | Yes | Transmission of general frequency $F_g$ by transponder 4 |
| F | No | Yes | Yes | Yes | Transmission of submersion code by transponder 1 |
| G | No | Yes | Yes | No | Transmission of submersion code by transponder 2 |
| H | No | Yes | No | No | Transmission of submersion code by transponder 3 |
| I | No | Yes | No | Yes | Transmission of submersion code by transponder 4 |
| J | No | No | Yes | Yes | Release transponder 1 |
| K | No | No | Yes | No | Release transponder 2 |
| L | No | No | Yes | No | Release transponder 3 |
| M | No | No | No | Yes | Release transponder 4 |

A generalized representation of a marine craft and its transponder, and two reference transponders 1 and 2, is illustrated in FIG. 2.

When the captain or pilot of a marine craft desires to know the coordinates of the craft in relation to submerged transponders 1 and 2, the first step, in accordance with the invention, is to measure the distance that separates these two transponders 1 and 2. For this purpose, the interrogator successively transmits codes F and G which control the transmission by transponders 1 and 2 of their respective submersion codes, thus making it possible to determine the depth of submersion of each. The interrogator then transmits code B, which causes transponder 1 to respond by transmitting the general frequency $F_g$. This response is received by the receiver of the craft which can calculate therefrom the distance of the craft from transponder 1 based on the duration of the period between the transmission of code B and the reception by the craft of the general frequency transmitted by the transponder. The response of transponder 1 is also received by transponder 2 as being a transmission code A and, since the response is equivalent to transmission code A, it causes a response of transponder 2 on its particular frequency. The period that elapses between the transmission of Code B and the reception by the craft of the particular frequency of transponder 2 makes it possible to determine the sum of (1) the distance separating the craft from transponder 1, (2) the distance separating transponders 1 and 2 and (3) the distance separating transponder 2 from the craft. An identical procedure is then followed with transponder 2 by interrogating the same according to code C. Thus, the distance is measured from the craft to transponder 2 and the sum of this distance with the separation distance between transponders 1 and 2, makes it possible to calculate this latter sum redundantly by comparing the measurements made successively using codes B and C. A simple calculation then makes it possible to determine a system of fixed coordinates in relation to the underwater floor, linked to the two transponders, in which the ideal surface of the sea constitutes plane $x0y$, the axis $0x$ being in the vertical plane passing through the two transponders, the axis $0y$ being in the mid-plane of the line segment joining these two transponders, and the axis $0z$ being perpendicular to plane $x0y$. Positioning of the craft can then be effected by transmitting code A only.

An important advantage of the invention is that, in addition to enabling positioning of the craft or vehicle in relation to stationary transponders 1 and 2, the invention permits positioning relative to the same stationary transponders 1 and 2, of other vehicles equipped with one of $2^{x-1}$ available transponders. Thus, for example, when it is desire to position a marine vehicle, equipped with the interrogator-receiver and an underwater vehicle equipped with a third transponder (which is not shown but will be referred to for the sake of convenience as transponder 3), in relation to stationary transponder 1 and 2, a determination is first made by the process described above, of the separation distance between stationary transponders 1 and 2. The interrogator then emits code D which causes the transmission, by stationary transponders 1 and 2, of their particular frequency and transmission by transponder 3, of general frequency $F_g$. The receiver of the marine vehicle, therefore, first receives the three responses referred to above, then two further responses coming from stationary transponders 1 and 2, and, subsequent to the reception of the latter, the general frequency transmitted by transponder 3. The marine vehicle is, therefore, able to determine its own coordinates in relation to stationary transponders 1 and 2, as well as those of the underwater vehicle equipped with transponder 3. Further, the underwater vehicle is able to establish its own coordinates as well as those of the marine vehicle, provided that the submersion depth of the underwater vehicle is known. The distance of the underwater vehicle from each of the stationary transponders 1 and 2 is actually established by the time period that elapses between the transmission by its associated transponder 3 of the general frequency $F_g$ and the reception by the underwater vehicle of the response signals of stationary transponders 1 and 2 to this transmission. To determine the coordinates of the marine vehicle, the computing unit of the underwater vehicle uses the difference of the distances between the marine vehicle and each stationary transponder which is obtained by subtracting the period that elapses between reception of the interrogation signal by the underwater vehicle and the response of transponders 1 and 2 to this interrogation, from half the period that elapses between the transmission of the general frequency by transponder 3 and reception by the underwater vehicle of the response of reference transponders 1 and 2 to this transmission.

Referring to FIG. 1 of the drawings, there is shown an embodiment of an interrogation and reception unit which permits the practice of the positioning technique of the invention as described hereinabove.

The unit illustrated includes $p$ emission channels and $q$ reception channels, $p$ being the number of distinct frequencies making up the interrogation code and $q$ the number of distinct response frequencies. The unit also includes an omnidirectional electroacoustic transducer 5, preferably in the form of an omnidirectional transmit-receive antenna, which operates both for transmission and reception and is connected to the transmission and reception channels by a multiplexer 6. The transmission channels are made up of a series of transmitters $7_i$, where $i=1, 2, \ldots p$, which provide all the distinct frequencies and which are connected to a corresponding set of modulators $8_i$. The reception channels are made up of a series of receivers $9_j$, where $j=1, 2 \ldots q$, all tuned to different frequencies and all connected to a common decoding circuit 10 which serves to decipher the code received, i.e., to determine which transponder actually transmitted the response signal in question. The output of decoding circuit 10 is connected to a computer 11 for calculating the required coordinates and providing an output connected to a display unit 12.

The modulators $8_i$ of the emission channels operate on an "all or nothing" or "go-no go" principle and are controlled by a transmission coding circuit 13 which is controlled, depending on the nature of the operation to be performed, either by a coding control circuit 14 which determines the proper codes for measuring the separation distance of the reference transponders, or by a master timer 15 which provides periodically triggering of the interrogation mode on the general frequency. A switch 16 provides selective connection of circuits 14 and 15 to coding circuit 13.

It is noted with regard to the active transponders, and particularly those used as a reference, the electronic circuits which make up these responders are generally similar to those of the interrogation-receiver described above, apart from the fact that the transmission frequencies and reception frequencies are reversed. Of course, the transponders do not include circuits corresponding to computing unit 11, display unit 12, timing unit 15 and initial code definition or control unit 14. In contrast, the output of the transponder circuit corresponding to decoding circuit 10 is connected to the equivalent of transmission coding circuit 13 by a transcoding circuit (not shown) which receives, in addition, the output of a submersion measuring unit. This transcoding circuit thus controls transponder coding circuit 13, depending on the nature of the code received by the transponder.

Where it is desired to simultaneously control positioning of a further vehicle in addition to the main vehicle, the further vehicle is equipped with a transponder similar to that described above and a receiver similar to that of the main vehicle.

There has thus been described a technique or process, and a system, of telemetry particularly well suited for relative positioning, in relation to the underwater floor, of one or more marine and/or underwater vehicles in relation to at least two submerged ultrasonic transponders which are stationary relative to the surface of the underwater floor and whose distance and submersion depth are not known beforehand. This system makes it possible to establish, instantaneously, a stationary reference system in relation to the underwater floor, whose geographic coordinates are not known, but which makes it possible to effect a dynamic anchoring, a systematic exploration or a return to a point already examined, without the need for determining each time the local geographic frame of reference.

The process of the invention can also be advantageously applied to the landing of an aircraft under poor visibility conditions using a beacon comprising electronic transponders located on both sides of the landing strip. In this case, the interrogation code is relatively simple and can be made of only two frequencies because the aircraft has its own altimeter.

Although the invention has been described relative to an exemplary embodiment thereof, it will be understood by those skilled in the art that variations and modifications may be effected in this exemplary embodiment without departing from the scope and spirit of the invention.

We claim:

1. A telemetry method for positioning at least a first body, carrying an interrogator, relative to at least two stationary active transponders whose relative coordinates are initially unknown, wherein positioning is performed by transmitting an interrogation code to which the transponders respond according to their individual codes, the interrogation code comprising a plurality of distinct frequencies equal in number to $n + 2$ where the number of reference transponders is $2^n$, said method being characterized by redundantly determining, prior to any operation in the positioning of the body, the coordinates of the transponders using a first interrogation code which, in addition to the $n$ frequencies used in identifying the reference transponders, comprises an additional frequency termed the general frequency such that when a said interrogation code made up of the general frequency and the identification code of a particular reference transponder is transmitted, only that particular transponder responds to this said general frequency while the other transponders respond responsive to their receiving the response to the general frequency of the transponder initially interrogated, and determining, using said interrogator, the periods, corresponding to the distances between each transponder and the body and to the sum of the distances between the interrogated transponder and the other transponders; the determination being repeated for each reference transponder to provide a redundant measurement of the distance between each of the reference transponders and the system of relative coordinates being completely determined when the reference transponders have transmitted a characteristic code representative of the distance in a horizontal reference plane in response to further, predetermined interrogation code.

2. A telemetry method as claimed in claim 1 used in simultaneously positioning a first vehicle equipped with an interrogator and at least one further vehicle equipped with an active transponder, relative to at least two active, stationary reference transponders, wherein subsequent to measuring the relative coordinates of the reference transponders, simultaneous positioning of said vehicles is provided by interrogating, using said interrogator, the transponder of the further vehicle so that said transponder re-transmits said general frequency, the stationary reference transponders thereafter transmitting a first response in accordance with the code dictated by the interrogation and a second, identical response as soon as said reference transponders receive the response to general frequency signal produced by the transponder of the further vehicle, whereby each said vehicle is then able to compute its own position and that of the other vehicle relative to the reference transponders.

3. A telemetry system for positioning at least one vessel carrying an interrogator, relative to at least two stationary active reference transponders whose relative coordinates are initially unknown, positioning of said vessel being performed by transmitting an interrogation code to which the transponders respond according to codes individual to the transponders, said system including a said interrogator comprising an omnidirectional transmit-receive antenna, a multiplexer connected to said antenna, for selectively connecting the antenna output to (a) $p$ transmission channels and (b) $q$ receiving channels, where $p$ is the number of distinct frequencies contained in the interrogation code and $q$ is the number of distinct response frequencies, said transmission channels each comprising a transmitter providing a distinct frequency and a modulator controlled by a transmission coding circuit, said receiving channels each comprising a receiver tuned to the respective frequencies of the response code of the transponders, said system further comprising a receiver decoding circuit connected to the output of said receivers and coordinate transforming computer means connecting to the output of said decoding circuit, said system further including a coding control circuit which determines the proper codes for measuring the separation distance between the reference transponders, a master timer for periodically triggering said interrogator to provide interrogation on a general frequency, and a switch for connecting said transmission coding circuit to said coding control circuit during the measurement of the relative coordinates of the reference transponders and for connecting said transmission coding circuit to said master timer during the measurement of the position of bodies relative to the reference transponders.

4. A telemetry system as claimed in claim 3 wherein said reference transponders comprise an omnidirectional antenna, a multiplexer connected to said antenna for selectively connecting the antenna output to transmission and receiving channels, each said transmission channel including a transmitter and a modulator controlled by a transmission coding circuit and each said receiving channel including a receiver, said transponders further comprising a receiving decoding circuit, and control of the transmission coding circuits of said reference transponders being provided by a transcoding circuit connected to the output of the receiver decoding circuit, the frequencies of transmission and receiving of said reference transponders being reversed as compared with said interrogator.

* * * * *